US012671291B2

(12) United States Patent
Song

(10) Patent No.: US 12,671,291 B2
(45) Date of Patent: Jun. 30, 2026

(54) BUS BAR ASSEMBLY

(71) Applicant: HL MANDO CORPORATION,
Gyeonggi-do (KR)

(72) Inventor: Baikkee Song, Gyeonggi-do (KR)

(73) Assignee: HL MANDO CORPORATION,
Gyeonggi-do (KR)

( * ) Notice: Subject to any disclaimer, the term of this
patent is extended or adjusted under 35
U.S.C. 154(b) by 221 days.

(21) Appl. No.: 18/377,758

(22) Filed: Oct. 6, 2023

(65) Prior Publication Data

US 2024/0313603 A1     Sep. 19, 2024

(30) Foreign Application Priority Data

Mar. 16, 2023     (KR) ......................... 10-2023-0034367

(51) Int. Cl.
H02K 3/52 (2006.01)

(52) U.S. Cl.
CPC ......... H02K 3/522 (2013.01); *H02K 2203/09*
(2013.01)

(58) Field of Classification Search
CPC .............................. H02K 3/04; H02K 2203/09
USPC ..................................................... 310/197, 71
See application file for complete search history.

(56) References Cited

U.S. PATENT DOCUMENTS

2022/0393547 A1* 12/2022 Kim ....................... H02K 5/225

FOREIGN PATENT DOCUMENTS

| | | |
|---|---|---|
| JP | 2004-215329 | 7/2004 |
| JP | 2010-148267 | 7/2010 |
| JP | 2022-127366 | 8/2022 |
| KR | 10-1917727 | 11/2018 |
| KR | 10-2021-0131542 | 11/2021 |

OTHER PUBLICATIONS

Office Action dated May 19, 2024 for Korean Patent Application
No. 10-2023-0034367 and its English translation provided by
Applicant's foreign counsel.

* cited by examiner

*Primary Examiner* — Oluseye Iwarere
*Assistant Examiner* — Minki Chang
(74) *Attorney, Agent, or Firm* — WOMBLE BOND
DICKINSON (US) LLP

(57)     ABSTRACT

Disclosed herein is a bus bar assembly. The bus bar assem-
bly according the present embodiment includes a plurality of
arc-shape body portions provided with different lengths and
disposed to be layered in a radial direction, coil connection
portions formed integrally with the body portions and pro-
vided at predetermined intervals on outer peripheral surfaces
of the body portions, and connected to a stator coil, and
terminals formed integrally with the body portions and
protruding from one end side of each of the body portions in
an axial direction, and disposed to be layered in a horizontal
direction, wherein one or more groove portions are provided
in at least one of the terminals so that wire resistance values
between the body portions are equalized.

18 Claims, 7 Drawing Sheets

【FIG. 1】
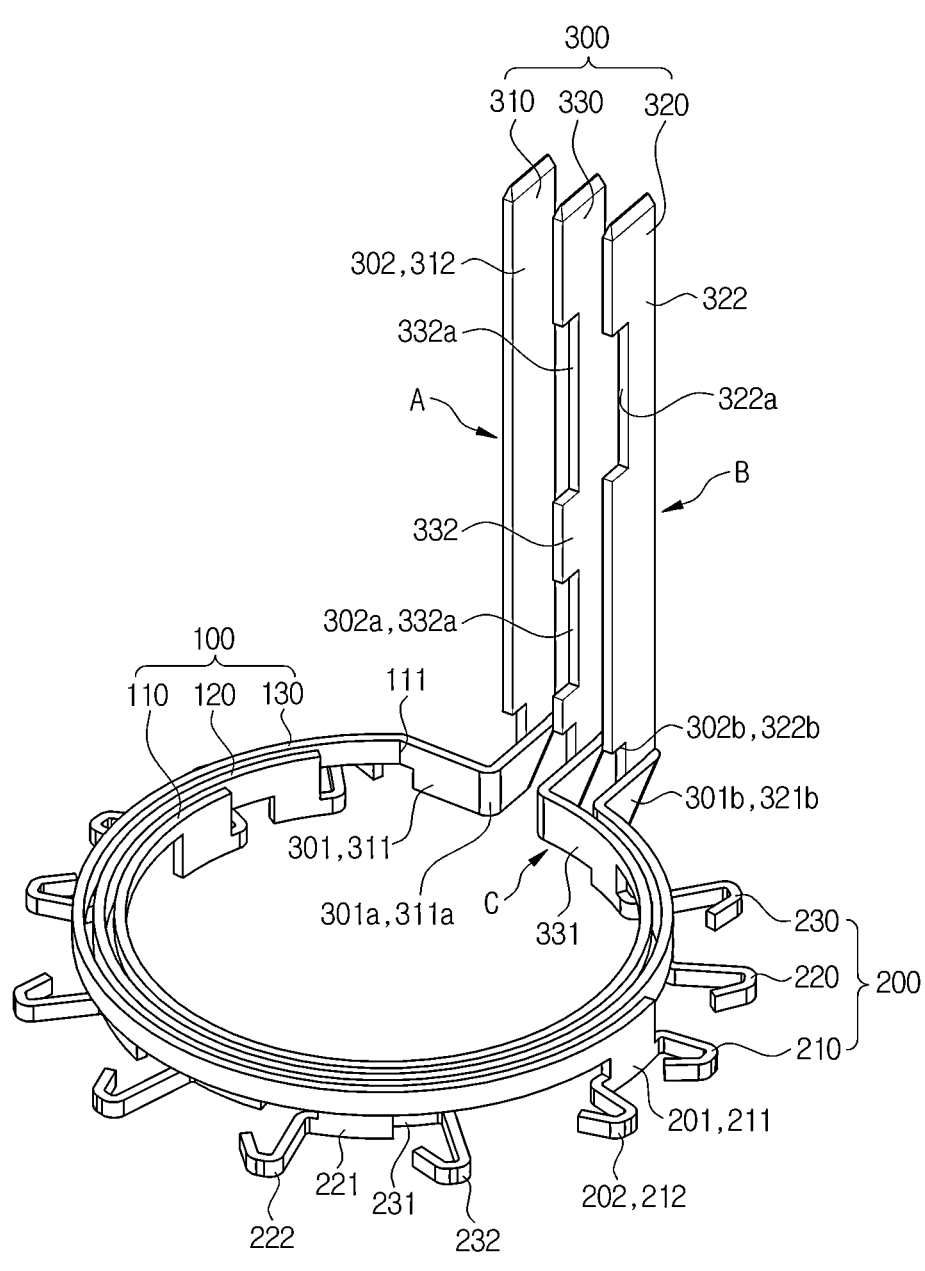

【FIG. 2】
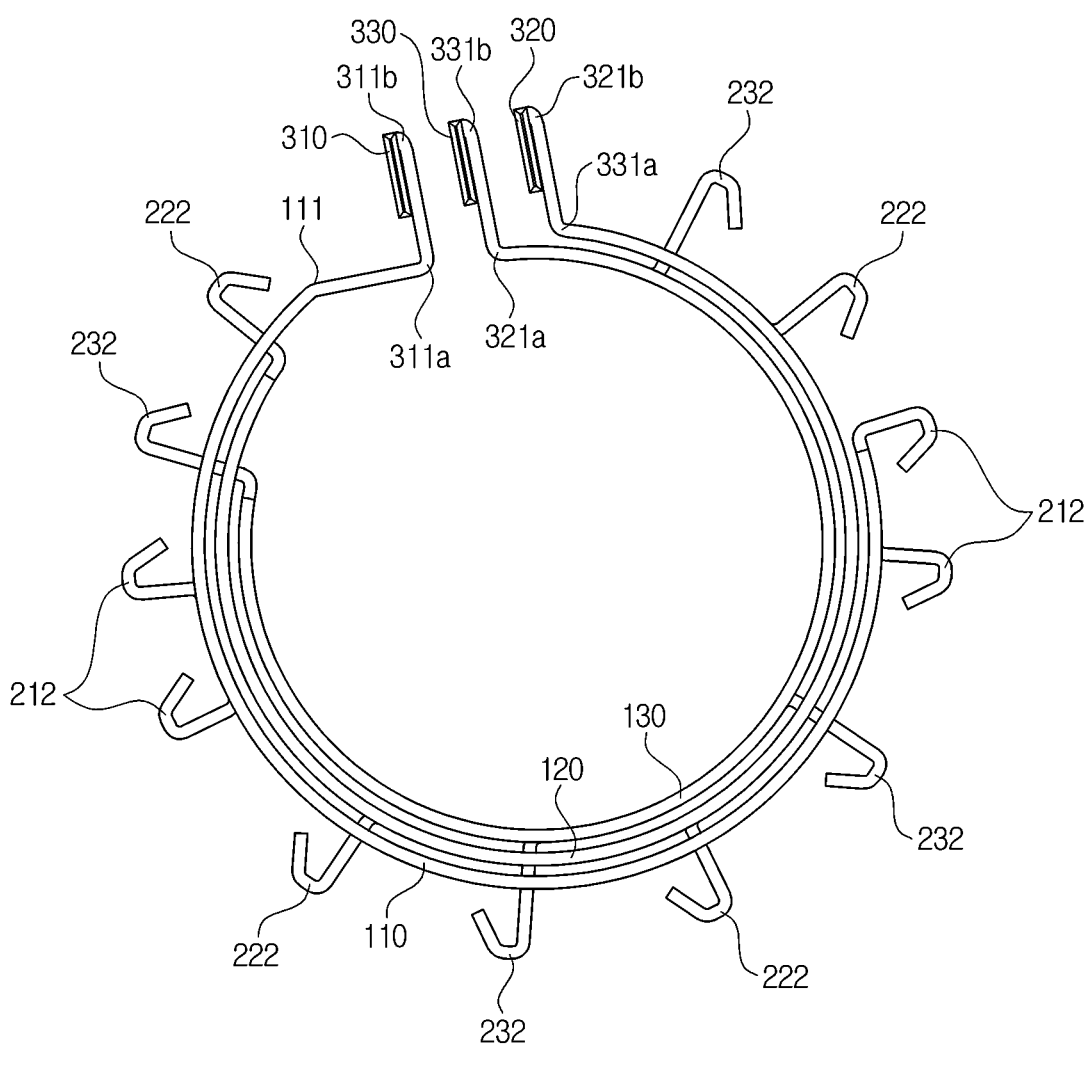

【FIG. 3】
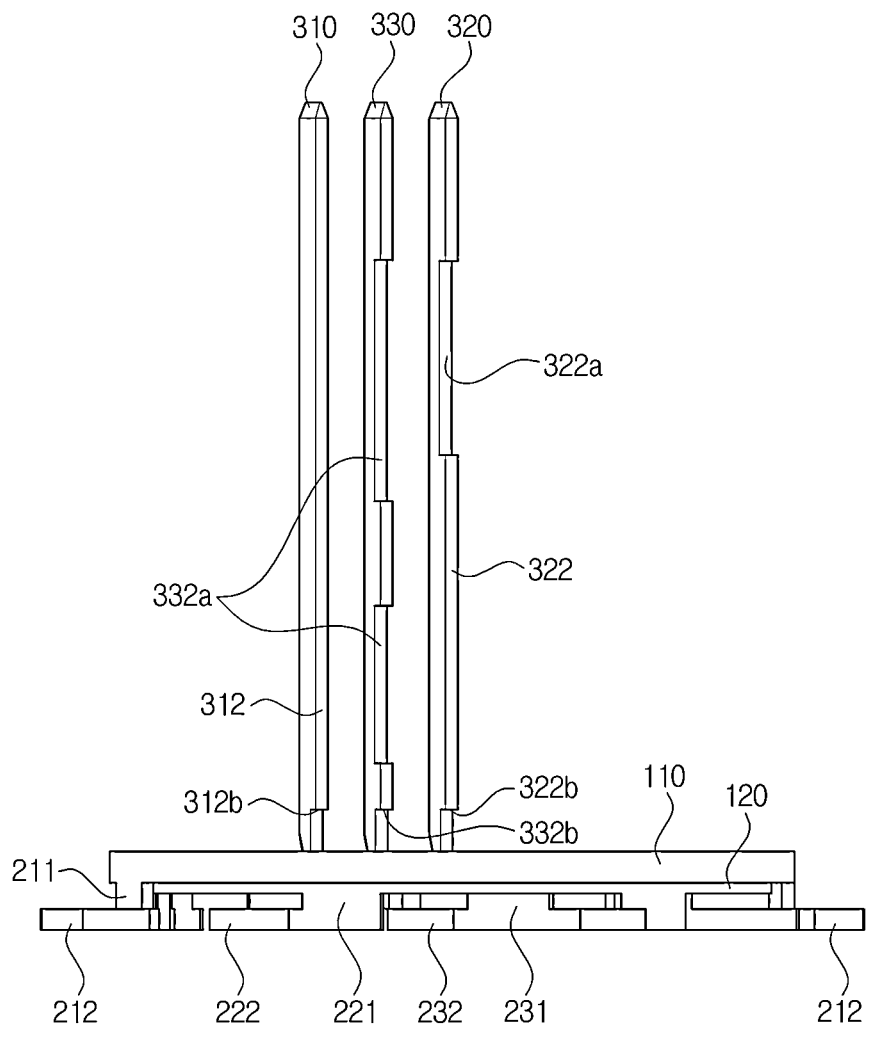

【FIG. 4】
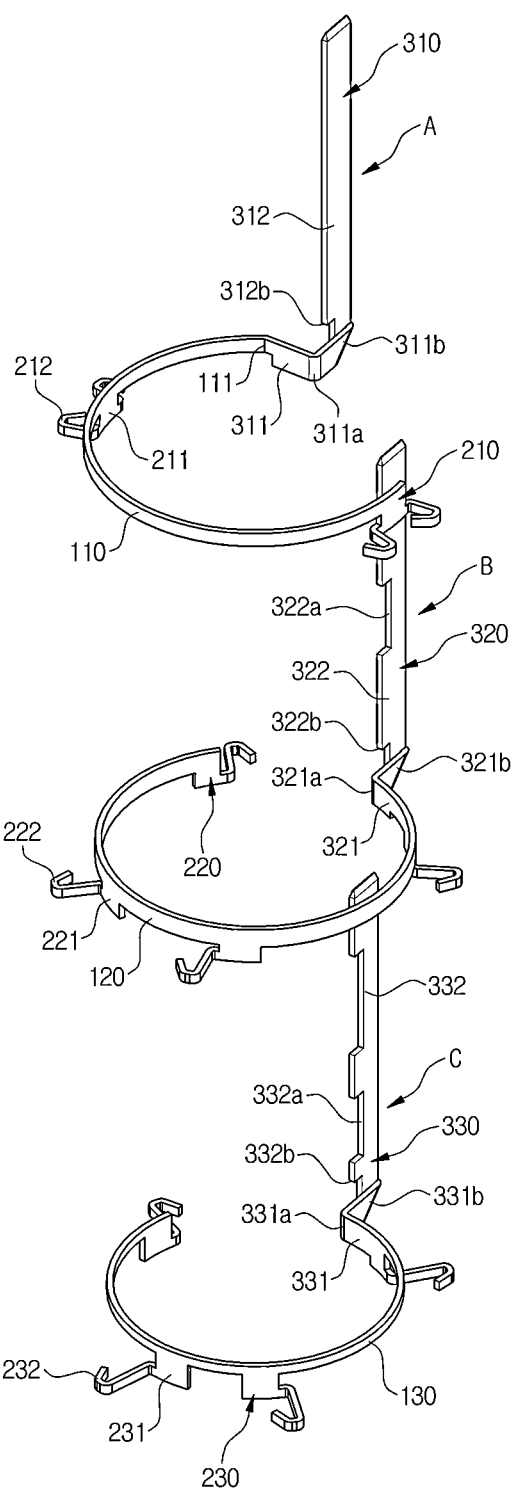

【FIG. 5】
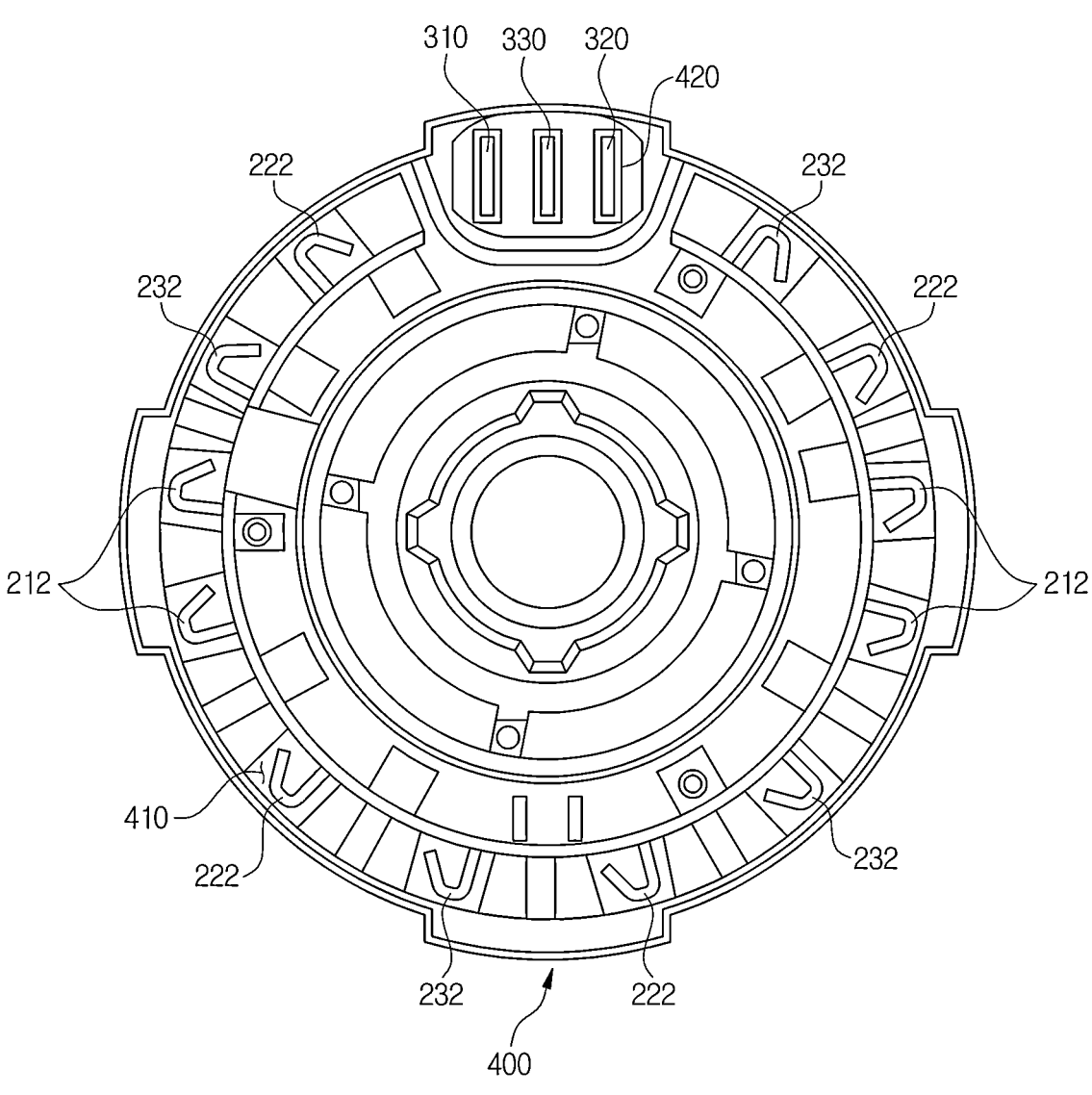

【FIG. 6】
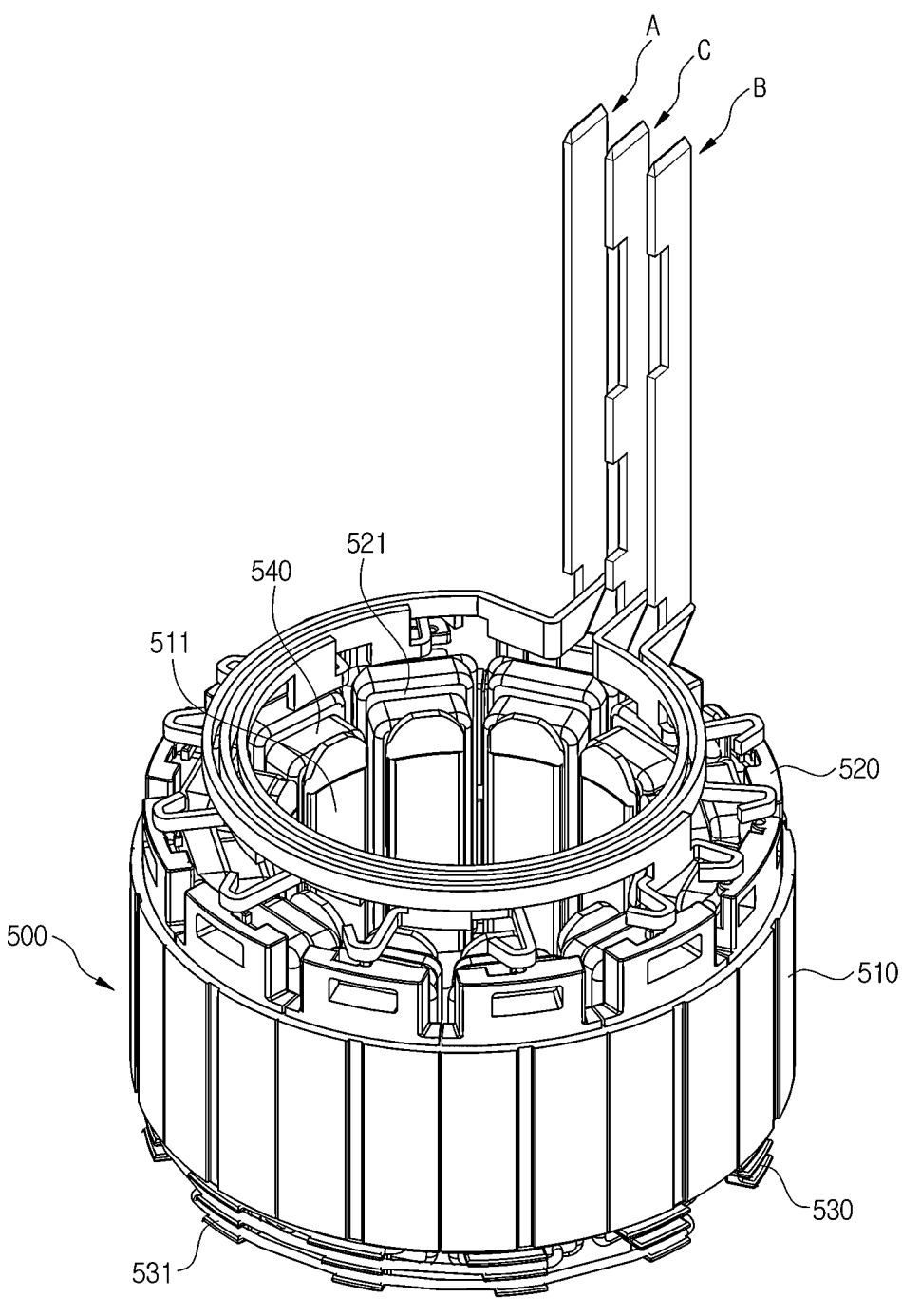

【FIG. 7】
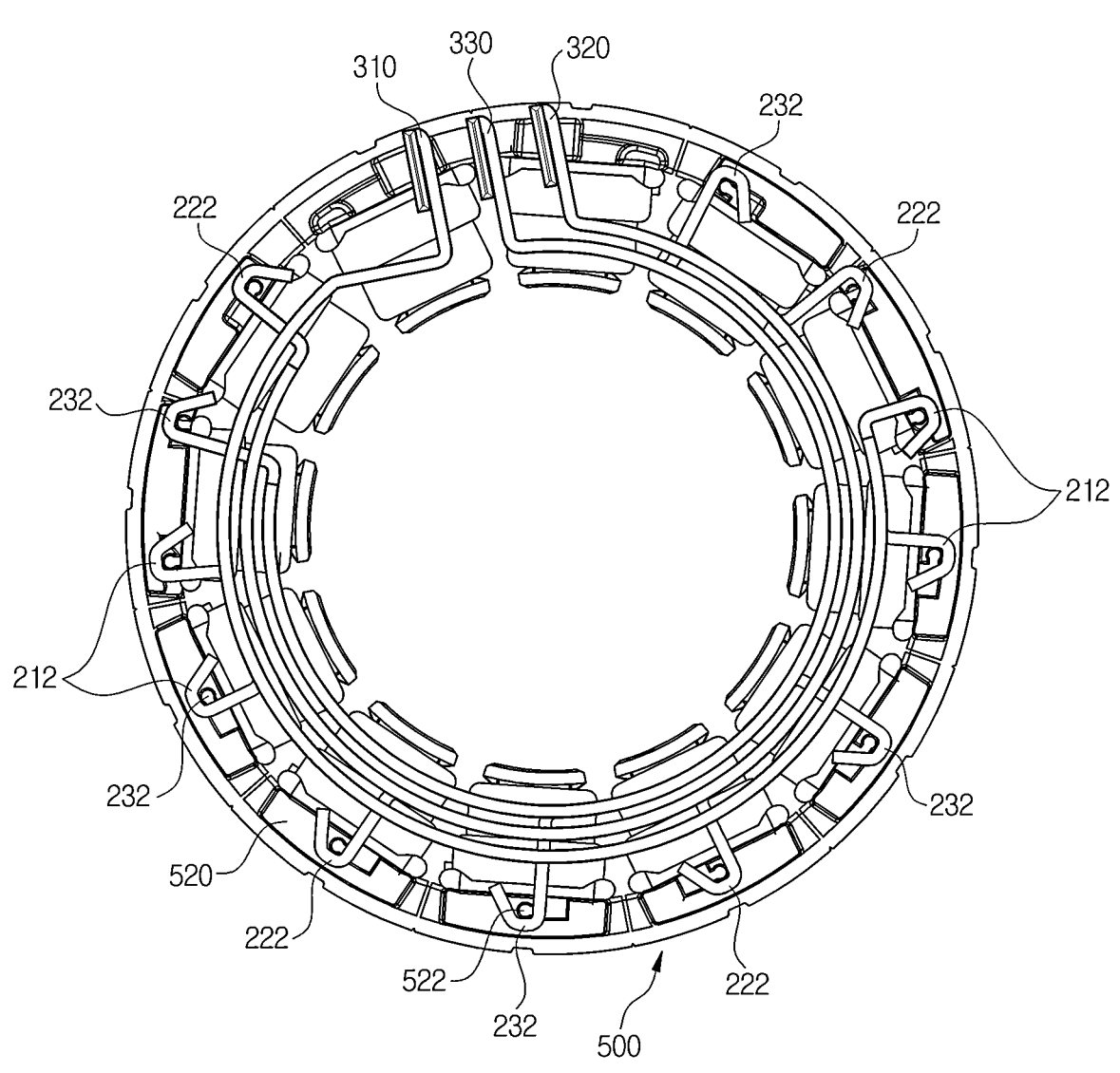

1

BUS BAR ASSEMBLY

CROSS-REFERENCE TO RELATED APPLICATION

This application claims the benefit of Korean Patent Application No. 10-2023-0034367, filed on Mar. 16, 2023 in the Korean Intellectual Property Office, the disclosure of which is incorporated herein by reference.

BACKGROUND

1. Field

Embodiments of the present disclosure relate to a bus bar assembly, and more particularly, to a bus bar assembly capable of significantly reducing harmonic components of torque that cause degradation in motor performance by equalizing wire resistance values even when a length of the bus bar for each phase is formed differently.

2. Description of the Related Art

In general, a motor has an outer appearance formed by the combination of a housing and a cover member, and includes a stator provided on an inner circumferential surface of the housing with a coil that forms a rotating magnetic field wound thereon, and a rotor rotatably installed in the center of the stator by an electromagnetic interaction with the stator.

On an upper end of the stator, an annular bus bar connected to the coil and terminals connected thereto by fusing or the like are provided.

The conventional motor has a disadvantage in that an assembly process is complicated due to a separate operation to connect the bus bar to the terminal. However, since the cover member is coupled after the bus bar is connected to the coil, a fusing portion in which the bus bar and the coil are connected can be equally disposed. Thereby, wire resistance values between a plurality of bus bars are formed equally. Accordingly, there is an advantage in that the torque output from the motor has almost no harmonic components.

However, in case of a motor in which the bus bar and the terminal are integrally provided, and the bus bar and the coil are connected after the cover member is fastened, there is an advantage in that the assembly process is simplified because no separate operation is required to connect the bus bar and the terminal. However, due to the location of the terminal, it is difficult to dispose the fusing portion equally spaced. Therefore, the length of the bus bar is formed to be different for each phase, resulting in different wire resistance values between the bus bars, which can cause problems such as uneven torque, overheating, decreased efficiency, and shortened life.

SUMMARY

Therefore, it is an aspect of the present disclosure to provide a bus bar assembly in which a bus bar and a terminal are integrally provided, thereby omitting a separate operation for connecting the bus bar and the terminal.

it is another aspect of the present disclosure to provide a bus bar assembly capable of significantly reducing harmonic components of torque that cause degradation in motor performance by equalizing wire resistance values of the bus bar for each phase, even when it is not possible to form a constant interval between the fusing portions due to terminal positions and the like.

In accordance with one aspect of the present disclosure, there is provided a bus bar assembly including a plurality of arc-shape body portions provided with different lengths and disposed to be layered in a radial direction, coil connection portions formed integrally with the body portions and provided at predetermined intervals on outer peripheral surfaces of the body portions, and connected to a stator coil, and terminals formed integrally with the body portions and protruding from one end side of each of the body portions in an axial direction, and disposed to be layered in a horizontal direction, wherein one or more groove portions are provided in at least one of the terminals so that interwire resistance values between the body portions are equalized.

The coil connection portion may include a fusing base formed to protrude from a lower side of the body portion in the axial direction, and a fusing portion protruding from a lower end of the fusing base in an outer circumferential direction to fuse with the stator coil.

One or two fusing portions may be provided on each of the fusing bases in a hook shape.

Each of the terminals may include a terminal base provided on one end side of the body portion, and a terminal body formed to protrude from the terminal base in the axial direction.

The terminal base may extend to a lower side of the body portion and be provided at a height greater than a height of the body portion.

The terminal base may include a bent portion bent from one end side of the body portion in an outer circumferential direction, and a folded portion bent from a lower end side of the terminal body in the axial direction.

The terminal bodies may protrude in the axial direction and be disposed to be layered at equal intervals in the horizontal direction.

The terminal bodies may be provided at the same height as each other and each have an upper end portion formed in a wedge shape.

In accordance with another aspect of the present disclosure, there is provided a bus bar assembly including a first bus bar in which a first body portion, a first coil connection portion, and a first terminal are integrally provided, a second bus bar in which a second body portion, a second coil connection portion, and a second terminal are integrally provided, and a third bus bar in which a third body portion, a third coil connection portion, and a third terminal are integrally provided, wherein each of the first body portion, the second body portion, and the third body portion has an arc shape having a different diameter and is disposed to be layered in a radial direction, and one or more groove portions are provided in at least one of the first terminal, the second terminal, or the third terminal, which are disposed to be layered in a horizontal direction so that interwire resistance values between the first bus bar, the second bus bar, and the third bus bar are equalized.

A diameter of the first body portion may be larger than a diameter of the second body portion, and the diameter of the second body portion may be larger than a diameter of the third body portion.

An interval between the first body portion and the second body portion in the radial direction may be formed to be the same as an interval between the second body portion and the third body portion in the radial direction.

The first body portion, the second body portion, and the third body portion may be formed at different lengths and heights, and upper portions thereof may be disposed at the same height.

The first coil connection portion may include a first fusing base formed to protrude from a lower side of the first body portion in an axial direction, and first fusing portions protruding from both sides of a lower end of the first fusing base in an outer circumferential direction and fusing with a stator coil.

The second coil connection portion may include a second fusing base formed to protrude from a lower side of the second body portion in the axial direction, and a second fusing portion protruding from one side of a lower end of the second fusing base in the outer circumferential direction and fusing with the stator coil.

The third coil connection portion may include a third fusing base formed to protrude from a lower side of the third body portion in the axial direction, and a third fusing portion protruding from one side of a lower end of the third fusing base in the outer circumferential direction and fusing with the stator coil.

The first fusing portion, the second fusing portion, and the third fusing portion may be formed and disposed at the same height.

Each of the first fusing portion, the second fusing portion, and the third fusing portion may be formed in a hook shape having an opening into which one end portion of the stator coil is inserted in the same direction.

The first terminal may include a first terminal base provided at one end side of the first body portion, and a first terminal body formed to protrude from the first terminal base in an axial direction.

The second terminal may include a second terminal base provided at one end side of the second body portion, and a second terminal body formed to protrude from the second terminal base in the axial direction.

The third terminal may include a third terminal base provided at one end side of the third body portion, and a third terminal body formed to protrude from the third terminal base in the axial direction.

The first terminal base may extend to a lower side of the first body portion and be provided at a height greater than a height of the first body portion, and include a first bent portion bent from one end side of the first body portion in an outer circumferential direction, and a first folded portion bent from a lower end side of the first terminal body in an axial direction.

The second terminal base may extend to a lower side of the second body portion and be provided at a height greater than a height of the second body portion, and include a second bent portion bent from one end side of the second body portion in the outer circumferential direction, and a second folded portion bent from a lower end side of the second terminal body in the axial direction.

The third terminal base may extend to a lower side of the third body portion and be provided at a height greater than a height of the third body portion, and include a third bent portion bent from one end side of the third body portion in the outer circumferential direction, and a third folded portion bent from a lower end side of the third terminal body in the axial direction.

The first terminal body, the second terminal body, and the third terminal body may be provided at the same height, the third terminal body may be disposed between the first terminal body and the second terminal body, and an interval between the first terminal body and the third terminal body may be formed to be the same as an interval between the second terminal body and the third terminal body.

The first body portion may be formed to be longer than the second body portion, and the second body portion may be formed to be longer than the third body portion.

The second terminal body may include a second groove portion, the third terminal body may include a third groove portion, and the third groove portion may be formed to have a larger area than the second groove portion.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a perspective view of a bus bar assembly in accordance with one embodiment of the present disclosure;

FIG. 2 is a top view of the bus bar assembly in accordance with one embodiment of the present disclosure;

FIG. 3 is a side view of the bus bar assembly in accordance with one embodiment of the present disclosure;

FIG. 4 is a perspective view for describing an assembly sequence of the bus bar assembly in accordance with one embodiment of the present disclosure;

FIG. 5 is a top view illustrating a state in which a cover member is coupled to the bus bar assembly in accordance with one embodiment of the present disclosure;

FIG. 6 is a perspective view illustrating a state in which the bus bar assembly is aligned with a stator in accordance with one embodiment of the present disclosure; and FIG. 7 is a top view illustrating a state in which the bus bar assembly is aligned with the stator in accordance with one embodiment of the present disclosure.

DETAILED DESCRIPTION

Hereinafter, embodiments of the present disclosure will be described in detail with reference to the accompanying drawings. The embodiments below are presented to sufficiently convey the ideas of the present disclosure to those skilled in the art to which the present disclosure belongs. The present disclosure is not limited to the embodiments presented herein and may be specified as other forms. To clarify the present disclosure, the drawings may omit the illustration of parts that are not related to the description, and the size of components may be somewhat exaggerated for ease of understanding.

In addition, hereafter, for convenience of description, height refers to a length in an axial direction, and width refers to a length in a radial direction or horizontal direction.

FIG. 1 is a perspective view of a bus bar assembly in accordance with one embodiment of the present disclosure, FIG. 2 is a top view of the bus bar assembly in accordance with one embodiment of the present disclosure, and FIG. 3 is a side view of the bus bar assembly in accordance with one embodiment of the present disclosure.

With reference to FIGS. 1 to 3, a bus bar assembly in accordance with one embodiment of the present disclosure includes a body portion 100, a coil connection portion 200, and a terminal 300 which are integrally provided, respectively.

In this case, the body portion 100, the coil connection portion 200, and the terminal 300 may be integrally formed by press-processing a sheet metal such as a copper plate made of a metal capable of conducting electricity.

A plurality of body portions 100 having different lengths are provided in an arc shape and disposed to form a layer in a radial direction. In this case, the body portions 100 are provided with different diameters from each other so that the body portions 100 may be disposed to form layers in the radial direction as described above.

More specifically, in case that the bus bar assembly in accordance with one embodiment of the present disclosure is applied to a three-phase motor, the body portion 100 may include a first body portion 110, a second body portion 120, and a third body portion 130 which may implement U, V, and W phases, respectively.

As illustrated in FIG. 2, among the body portions 100, the first body portion 110 is provided with the largest diameter, the third body portion 130 is provided with the smallest diameter, and the second body portion 120 is provided with an intermediate diameter between the diameter of the first body portion 110 and the diameter of the third body portion 130, which are disposed to form layers in the radial direction.

In this case, a layer interval in the radial direction formed by the first body portion 110 and the second body portion 120 may be formed to be the same as a layer interval in the radial direction formed by the second body portion 120 and the third body portion 130.

The first body portion 110, the second body portion 120, and the third body portion 130 may be formed at different heights, and may be disposed so that an upper portion of each body portion is positioned at the same height for rigid coupling with a cover member 400 that will be described below.

For example, the second body portion 120 may have the greatest height, the third body portion 130 may have the shortest height, and the first body portion 110 may be provided with an intermediate height between the height of the second body portion 120 and the height of the third body portion 130.

In addition, the first body portion 110 may further include a body bent portion 111 to allow the terminals 300, which are provided integrally with each of the body portions 100, to be layered in a horizontal direction, as illustrated in FIG. 2.

Meanwhile, the coil connection portion 200 is integrally provided with the body portion 100 at a predetermined interval on an outer circumferential surface of the body portion 100, and is connected to a stator coil 540 that will be described below.

The coil connection portion 200 includes a fusing base 201 that protrudes in an axial direction from a lower side of the body portion 100, and a fusing portion 202 that protrudes in an outer circumferential direction from a lower end of the fusing base 210 to fuse with the stator coil 540.

The fusing base 201 may be formed at a height greater than the height of the body portion 100 by protruding from the lower side of the body portion 100 as described above in order to stably support the fusing portion 202 to which an external force is applied when connected to the stator coil 540.

The fusing portion 202 is formed in the shape of a hook and is provided with an opening in one direction to allow an end of the stator coil 540 to be inserted from one side, and the opening provided in each of the fusing portions 202 may be formed in the same direction for easy connection to the stator coil 540.

More specifically, the coil connection portion 200 includes a first coil connection portion 210, a second coil connection portion 220, and a third coil connection portion

230 provided on the first body portion 110, the second body portion 120, and the third body portion 130, respectively.

The first coil connection portion 210 includes two first fusing bases 211 provided on one end side of the first body portion 110 and a side facing the one end side, respectively. In this case, each of the first fusing bases 211 is formed to protrude from the lower side of the first body portion 110 and includes a first fusing portion 212 formed to be bent in a hook shape on both sides of the first fusing base 211, respectively. That is, the first coil connection portion 210 includes two first fusing bases 211 and four first fusing portions 212.

The first fusing base 211 may be formed at a height greater than the height of the first body portion 110 in order to stably support the first fusing portion 212, which is connected to the stator coil 540 and formed at a relatively low height. In addition, the first fusing base 211 may be formed with a larger circumferential length than the second fusing base 221 and the third fusing base 231 to be described below, as the first fusing portions 212 are provided respectively on both sides of the fusing base 211 as described above.

The second coil connection portion 220 includes four second fusing bases 221 that are provided on one end side of the second body portion 120 and at predetermined intervals therefrom. In this case, each of the second fusing bases 221 is formed to protrude from a lower side of the second body portion 120 and includes a second fusing portion 222 formed to be bent in a hook shape on any one side of the first fusing base 211. That is, the second coil connection portion 220 includes four second fusing bases 221 and four second fusing portions 222.

The second fusing base 221 may be formed at a height greater than the height of the second body portion 120 in order to stably support the second fusing portion 222, which is connected to the stator coil 540 and formed at a relatively low height.

The third second coil connection portion 230 includes four third fusing bases 231 that are provided on one end side of the third body portion 130 and at predetermined intervals therefrom. In this case, each of the third fusing bases 231 is formed to protrude from a lower side of the third body portion 130 and includes a third fusing portion 232 formed to be bent in a hook shape on any one side of the first fusing base 211. That is, the third coil connection portion 230 includes four third fusing bases 231 and four third fusing portions 232.

The third fusing base 231 may be formed at a height greater than the height of the third body portion 130 in order to stably support the third fusing portion 232, which is connected to the stator coil 540 and formed at a relatively low height.

Each of the first fusing portion 212, the second fusing portion 222, and the third fusing portion 232 may be formed and disposed at the same height as each other, as illustrated in FIG. 3, in order to improve operational efficiency when connected to the stator coil 540. To this end, as described above, in case that the height of the second body portion 120 is the greatest, the height of the third body portion 130 is the smallest, and the height of the first body portion 110 is provided at an intermediate height between the height of the second body portion 120 and the height of the third body portion 130, a height of the second fusing base 221 may be the smallest, a height of the third fusing base 231 may be the greatest, and a height of the first fusing base 211 may be provided at an intermediate height between the height of the second fusing base 221 and the height of the third fusing base 231.

With reference to FIG. 2, there are a total of twelve fusing portions 202. The first fusing portion 212, the second fusing portion 222, and the third fusing portion 232 may be disposed in a counterclockwise direction with respect to the second fusing portion 222 that is provided on one end side of the second body portion 120 so that the third fusing portion 232, the first fusing portion 212, the first fusing portion 212, the second fusing portion 222, the third fusing portion 232, the second fusing portion 222, the third fusing portion 232, the first fusing portion 212, the first fusing portion 212, the second fusing portion 222, and the third fusing portion 232 may be sequentially provided.

In this case, intervals between the fusing portions 202 are partially non-uniform so that the terminals 300, which are integrally provided with the body portions 100 as described above, may be layered in the horizontal direction.

Meanwhile, the terminal 300 has a bar shape as a whole, is integrally formed with the body portion 100, protrudes from one end side of each of the body portions 100 in the axial direction, and is disposed to be layered in the horizontal direction to be connected to an external power source. In this case, the terminal 300 may include one or more groove portions 302a provided in at least one of the plurality of body portions 100 so that wire resistance values between the plurality of body portions 100 are equalized.

More specifically, the terminal 300 includes a terminal base 301 provided on one end side of the body portion 100 and a terminal body 302 formed to protrude from the terminal base 301 in the axial direction.

The terminal base 301 may extend to a lower side of the body portion 100 and may be provided at a height greater than the height of the body portion 100 to stably support the terminal body 302, which is relatively subject to an external force when connected to the power source. In addition, the terminal bases 301 may be formed and disposed at the same height as each other. More specifically, the terminal base 301 includes a bent portion 301a bent from one end side of the body portion 100 in the outer circumferential direction and a folded portion 301b bent from a low end side of the terminal body 302 in the axial direction.

The terminal body 302 may further include a stepped portion 302b at a lower end side thereof, which is provided adjacent to the folded portion 301b, and may be formed to have a greater width than the terminal base 301. In addition, the terminal body 302 may be provided to have an upper end in a wedge shape to facilitate insertion of a power connector or the like.

More specifically, the terminal 300 include a first terminal 310, a second terminal 320, and a third terminal 330, which are provided in the first body portion 110, the second body portion 120, and the third body portion 130, respectively.

The first terminal 310 includes a first terminal base 311 and a first terminal body 312 provided on one end side of the first body portion 110. Here, one end side of the first body portion 110 means an opposite side to one end side on which the first coil connection portion 210 is provided.

The first terminal base 311 may be formed adjacent to the body bent portion 111, which is provided to allow the plurality of terminals 300 to be layered in the horizontal direction, as described above. In addition, the first terminal base 311 extends to the lower side of the first body portion 110 and is provided at a height greater than the height of the first body portion 110 to stably support the first terminal body 312. The first terminal base 311 includes a first bent portion 311a bent from one end side of the first body portion 110 in the outer circumferential direction and a first folded portion 311b bent from the lower end side of the first terminal body 312 in the axial direction.

The first terminal body 312 may have a bar shape extending upward from the first folded portion 311b, include a first stepped portion 312b provided adjacent to the first folded portion 311b at a lower end thereof, and have an upper end formed in the wedge shape to facilitate coupling with a power connector or the like. In addition, the first terminal body 312 may be provided adjacent to the second fusing portion 222 in a clockwise direction with respect to the second fusing portion 222 that is provided on one end side of the second body portion 120 as illustrated in FIG. 2.

The second terminal 320 includes a second terminal base 321 and a second terminal body 322 provided on one end side of the second body portion 120. Here, one end side of the second body portion 120 means an opposite side to one end side on which the second coil connection portion 220 is provided.

The second terminal base 321 extends to the lower side of the second body portion 120 and is provided at a height greater than the height of the second body portion 120 to stably support the second terminal body 322. The second terminal base 321 includes a second bent portion 321a bent from one end side of the second body portion 120 in the outer circumferential direction and a second folded portion 321b bent from the lower end side of the second terminal body 322 in the axial direction.

The second terminal body 322 may have a bar shape extending upward from the second folded portion 321b, include a second stepped portion 322b provided adjacent to the second folded portion 321b at a lower end thereof, and have an upper end formed in the wedge shape to facilitate coupling with a power connector or the like. In addition, the second terminal body 322 includes at least one or more second groove portions 322a so that wire resistance values between the first body portion 110 and the second body portion 120 are equalized. In this case, the shape and area of the second groove portion 322a may be variously formed assuming that the wire resistance values between the first body portion 110 and the second body portion 120 are equalized as described above.

In addition, the second terminal body 322 may be provided adjacent to the third fusing portion 232 in a counter-clockwise direction with respect to the third fusing portion 232 that is provided on one end side of the third body portion 130 as illustrated in FIG. 2. In this case, the second terminal body 322 may be provided in parallel with the first terminal body 312.

The third terminal 330 includes a third terminal base 331 and a third terminal body 332 provided on one end side of the third body portion 130. Here, one end side of the third body portion 130 means an opposite side to one end side on which the third coil connection portion 230 is provided.

The third terminal base 331 extends to the lower side of the third body portion 130 and is provided at a height greater than the height of the third body portion 130 to stably support the third terminal body 332. The third terminal base 331 includes a third bent portion 331a bent from one end side of the third body portion 130 in the outer circumferential direction and a third folded portion 331b bent from the lower end side of the third terminal body 332 in the axial direction. In this case, the third terminal base 331 may be formed to extend to the lower side of the third body portion 130, as illustrated in FIG. 1, and may also be formed to extend to one side of the third fusing base 231.

The third terminal body 332 may have a bar shape extending upward from the third folded portion 331*b*, include a third stepped portion 332*b* provided adjacent to the third folded portion 331*b* at a lower end thereof, and have an upper end formed in the wedge shape to facilitate coupling with a power connector or the like. In addition, the third terminal body 332 includes at least one or more third groove portions 332*a* so that wire resistance values between the third body portion 130 and the first body portion 110 and between the third body portion 130 and the second body portion 120 are equalized. In this case, the shape and area of the third groove portion 332*a* may be variously formed assuming that the wire resistance values between the third body portion 130 and the first body portion 110 and between the third body portion 130 and the second body portion 120 are equalized as described above. For example, as the third body portion 130 is provided with a shorter length than the second body portion 120, an entire area of the third groove portion 332*a* may be formed larger than an entire area of the second groove portion 322*a*, or the number of the third groove portion 332*a* may be provided greater than the number of the second groove portion 322*a*.

In addition, the third terminal body 332 may be provided in parallel with the first terminal body 312 and the second terminal body 322 between the first terminal body 312 and the second terminal body 322, as illustrated in FIG. 2.

More specifically, the first terminal body 312, the second terminal body 322, and the third terminal body 332 may be provided with the same shape and disposed to be layered in the horizontal direction. In this case, an interval between the first terminal body 312 and the second terminal body 322 may be provided the same as an interval between the second terminal body 322 and the third terminal body 332.

Accordingly, the bus bar assembly in accordance with the present embodiment can significantly reduce harmonic components of torque that cause degradation in motor performance by equalizing the wire resistance values of the bus bars for each phase, even when it is not possible to form a constant interval between the fusing portions due to terminal positions and the like.

Meanwhile, FIG. 4 is a perspective view for describing an assembly sequence of the bus bar assembly in accordance with one embodiment of the present disclosure, and FIG. 5 is a top view illustrating a state in which a cover member is coupled to the bus bar assembly in accordance with one embodiment of the present disclosure. In addition, FIG. 6 is a perspective view illustrating a state in which the bus bar assembly is aligned with a stator in accordance with one embodiment of the present disclosure, and FIG. 7 is a top view illustrating a state in which the bus bar assembly is aligned with the stator in accordance with one embodiment of the present disclosure.

First, with reference to FIG. 4, the first body portion 110, the first coil connection portion 210, and the first terminal 310 are integrally provided to form a first bus bar A, the second body portion 120, the second coil connection portion 220, and the second terminal 320 are integrally provided to form a second bus bar B, and the third body portion 130, the third coil connection portion 230, and the third terminal 330 are integrally provided to form a third bus bar C.

Accordingly, the bus bar assembly in accordance with the present embodiment can improve efficiency of the assembly process of the motor, as a separate operation for connection of the bus bar and the terminal can be omitted.

As illustrated in FIG. 4, the disposition of the bus bar assembly in accordance with one embodiment of the present disclosure may be accomplished for the first bus bar A, the second bus bar B, and the third bus bar C as the second bus bar B is aligned from an upper side of the third bus bar C having the body portion 100 with the smallest diameter to a lower side thereof, and the first bus bar A having the body portion 100 with the largest diameter is aligned from upper sides of the third bus bar C and the second bus bar B which have been aligned, to lower sides thereof.

In this case, at least one of the first terminal 310, the second terminal 320 or the third terminal 330 may include one or more groove portions 302*a* provided to equalize the wire resistance values between the first bus bar A, the second bus bar B, and the third bus bar C.

Meanwhile, a stator and a cover member on which the bus bar assembly in accordance with one embodiment of the present disclosure is mounted will be described below.

The cover member 400 is a member fastened to an upper side of a housing (not illustrated) that has openings at an upper side thereof, or upper and lower sides thereof, in which a stator 500 and a rotor (not illustrated) are embedded, and the cover member 400 includes twelve coil connection openings 410 in which each of the twelve fusing portions 202 is provided to be exposed upward, and three terminal openings 420 provided in parallel at equal intervals to allow the three terminal bodies 302 to protrude in the axial direction, as illustrated in FIG. 5.

In this case, the coil connection openings 410 are passages through which tools for connecting each fusing portion 202 and one end of the stator coil 540 enter and exit, and are windows through which a connection state of the fusing portion 202 and the stator coil 540 can be visually identified in a state in which the bus bar assembly in accordance with one embodiment of the present disclosure is disposed on an upper side of the stator 500, and the cover member 400 is coupled to the housing. Accordingly, the positions of the coil connection openings 410 are determined by the intervals between the fusing portions 202, which are non-uniformly formed at least in part as described above.

With reference to FIGS. 6 and 7, the stator 500 includes a stator core 510 fixedly provided on an inner circumferential surface of the housing, an upper insulator 520 and a lower insulator 530 fastened to upper and lower sides of the stator core 510, respectively, and a stator coil 540 wound on the stator core 510.

The stator core 510 includes twelve core winding portions 511 where the stator coils 540 are wound.

The upper insulator 520 includes twelve upper insulator winding portions 521 provided on an upper side of each of the core winding portions 511 and twelve coil holders 522 that are fixed to allow one end of the stator coil 540 to be connected to the fusing portion 202.

The lower insulator 530 includes twelve lower insulator winding portions 521 provided on the lower side of each of the core winding portions 511.

Accordingly, the stator coil 540 is wound on each of the core winding portions 511, the upper insulator winding portions 521 and the lower insulator winding portions 521, and one end of the stator coil 540 is fixed to the coil holder 522 for connection to the fusing portion 202. To this end, the coil holder 522 may be provided in the hook shape with an opening formed on one side thereof so that one end portion of the stator coil 540 may be inserted. In addition, the coil holder 522 has the same disposition as the fusing portion 202 and the coil connection opening 410.

While the specific embodiment related to the bus bar of the present disclosure have been described above, it is obvious that various modifications may be made without departing from the scope of the present invention.

A bus bar assembly in accordance with the present embodiment can improve efficiency of an assembly process of the motor as a separate operation for connection of the bus bar and the terminal can be omitted.

A bus bar assembly in accordance with the present embodiment can significantly reduce harmonic components of torque that cause degradation in motor performance by equalizing wire resistance values of bus bars for each phase even when it is not possible to form a constant interval between the fusing portions due to terminal positions and the like, thereby improving motor performance.

Therefore, the scope of the present disclosure should not be limited to the described exemplary embodiments, and should be defined by not only the claims to be described below, but also those equivalent to the claims.

Accordingly, it should be understood that the aforementioned exemplary embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

What is claimed is:

1. A bus bar assembly comprising:
a plurality of arc-shape body portions provided with different lengths and disposed to be layered in a radial direction;
coil connection portions formed integrally with the body portions and provided at predetermined intervals on outer circumferential surfaces of the body portions, and connected to a stator coil; and
terminals formed integrally with the body portions and protruding from one end side of each of the body portions in an axial direction, and disposed to be layered in a horizontal direction,
wherein each of the terminals includes a terminal base provided on one end side of the body portion, and terminal bodies formed to protrude from the terminal base in the axial direction,
wherein two or more groove portions having different areas are provided in at least one of the terminal bodies so that wire resistance values between the body portions are equalized.

2. The bus bar assembly of claim 1, wherein the coil connection portion includes a fusing base formed to protrude from a lower side of the body portion in the axial direction, and
a fusing portion protruding from a lower end of the fusing base in an outer circumferential direction to fuse with the stator coil.

3. The bus bar assembly of claim 2, wherein one or two fusing portions are provided on each of the fusing bases in a hook shape.

4. The bus bar assembly of claim 1, wherein the terminal base extends to a lower side of the body portion and is provided at a height greater than a height of the body portion.

5. The bus bar assembly of claim 1, wherein the terminal base includes a bent portion bent from one end side of the body portion in an outer circumferential direction, and
a folded portion bent from a lower end side of the terminal body in the axial direction.

6. The bus bar assembly of claim 1, wherein the terminal bodies protrude in the axial direction and are disposed to be layered at equal intervals in the horizontal direction.

7. The bus bar assembly of claim 1, wherein the terminal bodies are provided at the same height as each other and each have an upper end portion formed in a wedge shape.

8. A bus bar assembly comprising:
a first bus bar in which a first body portion, a first coil connection portion, and a first terminal are integrally provided;
a second bus bar in which a second body portion, a second coil connection portion, and a second terminal are integrally provided; and
a third bus bar in which a third body portion, a third coil connection portion, and a third terminal are integrally provided,
wherein each of the first body portion, the second body portion, and the third body portion has an arc shape having a different diameter and is disposed to be layered in a radial direction,
wherein the first terminal includes:
a first terminal base provided at one end side of the first body portion; and
a first terminal body formed to protrude from the first terminal base in an axial direction,
the second terminal includes:
a second terminal base provided at one end side of the second body portion; and
a second terminal body formed to protrude from the second terminal base in the axial direction, and
the third terminal includes:
a third terminal base provided at one end side of the third body portion; and
a third terminal body formed to protrude from the third terminal base in the axial direction,
wherein two or more groove portions having different areas are provided in at least one of the first terminal body, the second terminal body, or the third terminal body, which are disposed to be layered in a horizontal direction so that wire resistance values between the first bus bar, the second bus bar, and the third bus bar are equalized.

9. The bus bar assembly of claim 8, wherein a diameter of the first body portion is larger than a diameter of the second body portion, and
the diameter of the second body portion is larger than a diameter of the third body portion.

10. The bus bar assembly of claim 8, wherein an interval between the first body portion and the second body portion in the radial direction is formed to be the same as an interval between the second body portion and the third body portion in the radial direction.

11. The bus bar assembly of claim 8, wherein the first body portion, the second body portion, and the third body portion are formed at different lengths and heights, and upper portions thereof are disposed at the same height.

12. The bus bar assembly of claim 8, wherein the first coil connection portion includes:
a first fusing base formed to protrude from a lower side of the first body portion in an axial direction; and
first fusing portions protruding from both sides of a lower end of the first fusing base in an outer circumferential direction and fusing with a stator coil,
the second coil connection portion includes:
a second fusing base formed to protrude from a lower side of the second body portion in the axial direction; and
a second fusing portion protruding from one side of a lower end of the second fusing base in the outer circumferential direction and fusing with the stator coil, and the third coil connection portion includes:

a third fusing base formed to protrude from a lower side of the third body portion in the axial direction; and a third fusing portion protruding from one side of a lower end of the third fusing base in the outer circumferential direction and fusing with the stator coil.

13. The bus bar assembly of claim 12, wherein the first fusing portion, the second fusing portion, and the third fusing portion are formed and disposed at the same height.

14. The bus bar assembly of claim 12, wherein each of the first fusing portion, the second fusing portion, and the third fusing portion is formed in a hook shape having an opening into which one end portion of the stator coil is inserted in the same direction.

15. The bus bar assembly of claim 8, wherein the first terminal base extends to a lower side of the first body portion and is provided at a height greater than a height of the first body portion, and includes:

a first bent portion bent from one end side of the first body portion in an outer circumferential direction; and a first folded portion bent from a lower end side of the first terminal body in an axial direction, the second terminal base extends to a lower side of the second body portion and is provided at a height greater than a height of the second body portion, and includes:

a second bent portion bent from one end side of the second body portion in the outer circumferential direction; and a second folded portion bent from a lower end side of the second terminal body in the axial direction, and the third terminal base extends to a lower side of the third body portion and is provided at a height greater than a height of the third body portion, and includes:

a third bent portion bent from one end side of the third body portion in the outer circumferential direction; and a third folded portion bent from a lower end side of the third terminal body in the axial direction.

16. The bus bar assembly of claim 8, wherein the first terminal body, the second terminal body, and the third terminal body are provided at the same height, the third terminal body is disposed between the first terminal body and the second terminal body, and an interval between the first terminal body and the third terminal body is formed to be the same as an interval between the second terminal body and the third terminal body.

17. The bus bar assembly of claim 8, wherein the first body portion is formed to be longer than the second body portion, and the second body portion is formed to be longer than the third body portion.

18. The bus bar assembly of claim 17, wherein the second terminal body includes a second groove portion, the third terminal body includes a third groove portion, and the third groove portion is formed to have a larger area than the second groove portion.

* * * * *